United States Patent [19]

Park

[11] Patent Number: 4,903,925
[45] Date of Patent: Feb. 27, 1990

[54] EYEGLASS HOLDER

[76] Inventor: Steve S. Park, 70 Woodcrest Dr., Syosset, N.Y. 11791

[21] Appl. No.: 253,493

[22] Filed: Oct. 5, 1988

[51] Int. Cl.⁴ .............................................. B60R 11/00
[52] U.S. Cl. ............................. 248/206.1; 248/206.2; 248/902
[58] Field of Search ........... 248/206.2, 206.1, DIG. 2, 248/205.5, 291, 300; 211/13

[56] References Cited

U.S. PATENT DOCUMENTS

| | | | |
|---|---|---|---|
| 993,404 | 5/1911 | Price | 248/300 |
| 1,553,095 | 9/1925 | Moore | 248/183 X |
| 2,309,121 | 1/1943 | Keely | 248/206.1 |
| 2,519,222 | 8/1950 | Brooks | 248/206.1 |
| 2,735,341 | 2/1956 | Borsody | 248/205.5 X |
| 3,229,944 | 1/1966 | Everburg | 248/DIG. 2 X |
| 3,519,138 | 7/1970 | Murray | 248/DIG. 2 X |

FOREIGN PATENT DOCUMENTS 415105 12/1966 Switzerland .................. 248/DIG. 2
1441581 7/1976 United Kingdom ......... 248/DIG. 2

*Primary Examiner*—Alvin C. Chin-Shue

[57] ABSTRACT

Apparatus for supporting and receiving a pair of eyeglasses or sunglasses. The eyeglass or sunglass holder has adjustments which allow it to be removably mounted by suction cups onto any nonporous surface and at any angle. The eyeglass holder has a feature enabling it to receive and secure a pair of eyeglasses vertically by supporting the bridge rather than the rims. The rims of eyeglasses stabilize the eyeglass against any lateral forces by the triangular design of the eyeglass brace.

3 Claims, 1 Drawing Sheet

EYEGLASS HOLDER

BACKGROUND OF THE INVENTION

The present invention relates generally to eyeglass or sunglass holder and more particularly, to a device which is design to receive and support a pair of eyeglasses or sunglasses.

It is a well-known fact that many automobile drivers are required by law to wear prescription eyeglasses while operating an automobile or vehicle. It is also a well-known fact that many automobile drivers wear sunglasses to protect the driver's eyes from the Sun's rays as well as to aid in observing the road ahead. However, many situation arises where it becomes necessary to remove the eyeglass or sunglass and the the problem emerges as to where the eyeglass or sunglass could safely be stored. Presently, many of the sunglasses or eyeglasses when not in use are simply placed on the automobile or vehicle seat where the eyeglasses or sunglasses could be accidently sat upon. Another solution commonly used to solve this eyeglasses placement problem is to store the eyeglass on top of an automobile dashboard, however there are disadvantages to this solution, in particular the eyeglasses may fall off when the automobile or vehicle begins to move.

The automobile or vehicle is not the sole environment where the difficulty of eyeglass storage becomes visible, the home or office could also lend itself to bear such a dilemma.

Heretofore, such eyeglass holder devices are usually mounted on top of the dashboard or a table with some known adhesive which could ruin the dashboard or table when remove and these prior device does not protect the eyeglass or sunglass against lateral displacement.

Thus, a new and improved eyeglass holder must be developed in which the eyeglass holder can overcome all the shortcoming of prior art.

SUMMARY OF THE INVENTION

In accordance with the invention claimed, a relatively simple to construct and easy to install eyeglass holder is provided which may be mounted on any nonporous surface at any angle when it is desired to hold a pair of eyeglasses.

It is, therefore, an object of the present invention to overcome the problem of storage in eyeglasses when not in use. To fulfill the foregoing an adjustable support has been innovated to receive and brace all different types and sizes of eyeglasses against longitudinal displacement at well as latitudinal displacement of a pair of eyeglasses.

Another object of the present invention is to have a removably mounted base which could be attached on any nonporous surface and at any angle.

It is still another object of the present invention to provide an eyeglasses holder where the eyeglasses holder could be mounted on a nonstationary surface and still firmly bolster a pair of eyeglasses.

It is a further object of the present invention to provide a support for the eyeglass which is capable of securing all the various types and sizes of eyeglasses by a brace design to secure a pair of eyeglasses by supporting the bridge of a eyeglass rather than solely the rims.

It is still a further object of the present invention to provide a eyeglass holder which can be manufactured entirely out of plastic to economize manufacturing cost.

It is an object of the present invention to provide a device which is easy to install as well as use.

It is another object of the present invention to provide a eyeglass holder in which a eyeglass can easy be supported and removed.

All the unique advantages and function that characterize this invention will become apparent as the drawings and the descriptions of the preferred embodiment are exhibited in their entirety.

DESCRIPTION OF THE PRIOR ART

U.S. Pat. No. 1,710,847 discloses eyeglass display fixture in which the eyeglass is supported by bracing the lower rims of an eyeglass.

U.S. Pat. No. 2,202,242 discloses eyeglass holder which supports the lower rim of the eyeglasses and the eyeglass supporter is mounted by suction cup.

U.S. Pat. No. 3,552,701 discloses an interior auto mirror sunglass support in which the sunglasses are supported by the arms of a sunglass.

U.S. Pat. No. 3,633,689 discloses a eyeglass frame straightener in which the eyeglass frame straightener holds the bride of a eyeglass and applies pressure to the ends of the eyeglass to align the eyeglass frame.

DETAILED DESCRIPTION OF THE PREFERRED EMBODIMENTS

Figure 5:
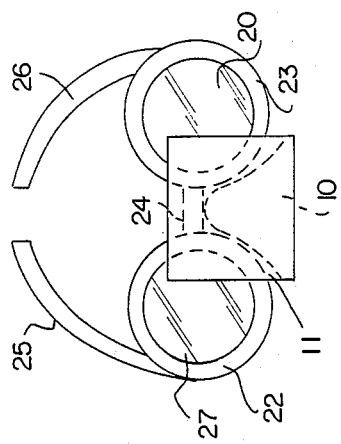
FIG. 5 is a frontal view of merely the eyeglass stabilizer, (brace) supporting a pair of eyeglasses without the main body of the preferred embodiment.
Figure 4:
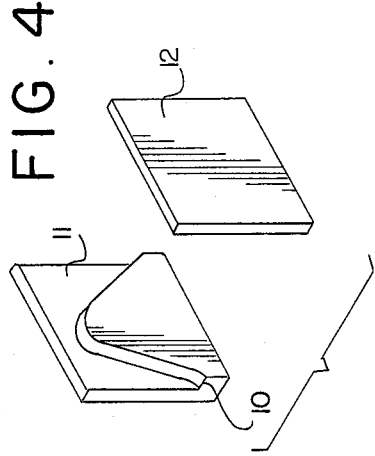
FIG. 4 is a detailed view of the eyeglass support and stabilizer, (eyeglass brace) taken along F—F in FIG. 3.

Many features and innovation of the said invention come clear into view as detail descriptions along with drawings show the advantages in construction and arrangement of parts of the preferred embodiment whereby the desired advantages are attained.

Referring more particularly to the drawings, in which similar reference characters denote similar elements through the several views, FIGS. 1 through 5 illustrate a eyeglass rectangular base (2) with a triangular element (3) mounted by any number of acceptable means on top of base (2) in which both the triangular element (3) and base (2) are situated such that both elements converge at point (13). A suction cup (4) is affixed to a side of triangular element (3) which is diagonally opposite point (13), where base (2) and triangular element (3) unite. A spring locked adjustable system consisting of two cylinders (5) and (6) each having teeth (14) facing each other that enable two cylinders (5) and (6) to interlock are held together by a bolt (7) which lodges through the center of both cylinder (5) and (6) and spring (8) is placed over the free end of bolt (7) and capped with nut (9). Cylinder (5) is connected to base (2) at point (15), the other cylinder (6) is then connected to plan rectangular element (11) which is part of eyeglass brace (B). The eyeglass brace (B) comprises one planar triangular shaped element (10) with a curved top affixed between two planar rectangular elements (11) and (12), allowing the foremention eyeglass brace (B) to pivot about bolt (7) in order to maximize the holding effect of the eyeglass brace (B).

Figure 1:
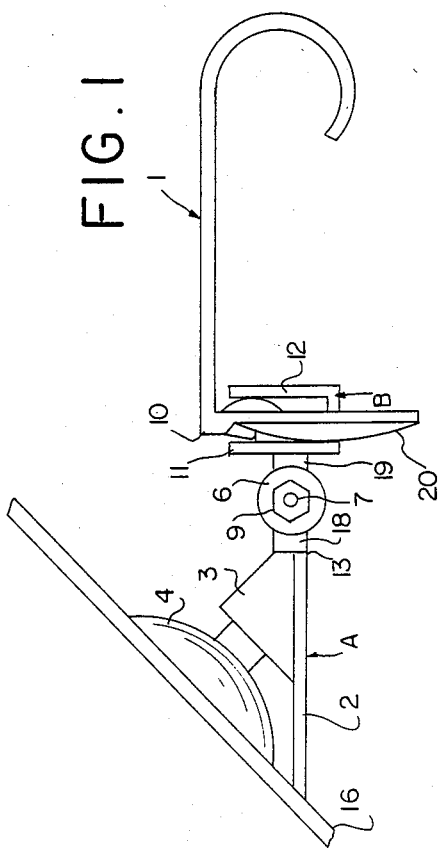
FIG. 1 is a side elevation view of the embodiment mounted on the interior of a automobile windshield and showing a pair of eyeglasses supported by the preferred invention.
Figure 2:
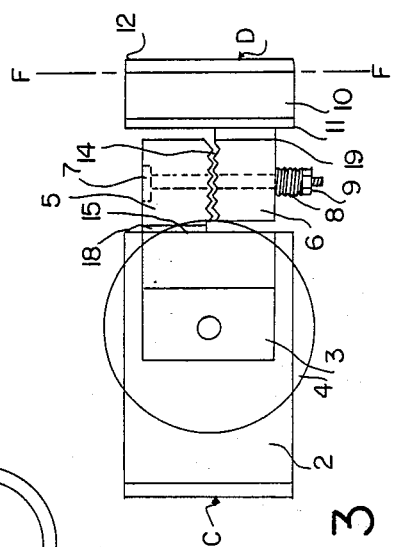
FIG. 2 is a side elevation view of the preferred embodiment mounted on a nonporous vertical surface and supporting a pair of eyeglasses.
Figure 3:
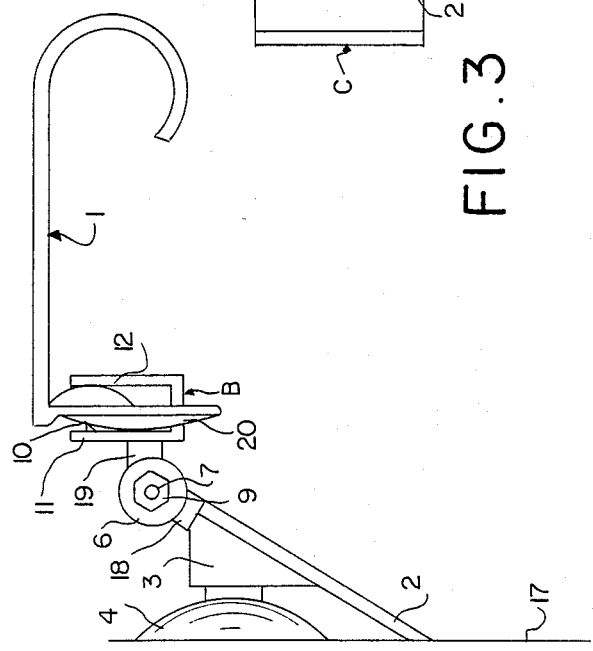
FIG. 3 is a top plan exploded view of the preferred embodiment.

The main body of the eyeglass holder (A) comprising a rectangular base (2) connected to a triangular element (3) which has suction cup (4) diagonally opposite point (13) is used to steadfast the eyeglass brace (B) against any nonporous surface such as the interior side of automobile windshield (16) and a nonporous wall (17). When an eyeglass (1) is received into the eyeglass brace (B) the weight of eyeglass (1) is transferred along said main body and the said main body is forced into windshield (16) or wall (17) as shown in FIG. 1 and FIG. 2. This configuration minimizes the rattling of eyeglass (1) when eyeglass holder (A) is mounted onto a nonstationary object such a car windshield (16) and it also aids in supporting the eyeglass (1).

The interlocking adjustable system comprising two cylinders (11) and (12) with each having a flat rectangular portion (19) and (20) extenting from the said cylinders (11) and (12) which are used to mount the adjustable system to the main body and eyeglass brace (B) are locked together by a bolt (7) and between cylinder (6) and nut (9) to create a constant force in order to keep cylinder (5) and (6) together allows eyeglass brace (B) to pivot about bolt (7) to any angle in order to optimize the holding effect of eyeglass brace (B) on eyeglass (1).

First let it be known that point (C) will be considered the front of the invention and point (D) will be accepted as the rear of the present embodiment (A). The eyeglass brace (B) comprising one planar triangular element (10) with a curved top and two curve lengths extending downward from the curve top and situated in between two plan rectangular elements (11) and (12) is designed to hold a pair of eyeglasses (1) by fitting the bottom contour of an eyeglass created by the two rims (22) and (23) and bridge (24) of an eyeglass (1). A pair of eyeglass (1) is receive in between the two flat rectangular elements (11) and 12) where the eyeglass (1) comes to rest upon the curved center element (10) then lens (20) and (27) of eyeglass (1) is press forward against plan rectangular element (11) by the weight of bows (25) and (26) of eyeglass (1) and rear plate (12) supports the upper portion of the rims (22) and (23) preventing backward displacement of eyeglass (1). In order to remove eyeglass (1) from eyeglass holder (A) simply grasp any bow (25) or (26) and raise eyeglass (1) vertically from eyeglass brace (B). This unique configuration of elements prevent eyeglass displacement due to the fact that the surface in which the sunglass holder is mounted upon is not necessarily stationary. This exclusive design of the eyeglass brace (B) also prevents any lateral displacement by filling the space between the two rims (22) and (23) and bridge (24) as shown in FIG. 5.

Having thus described the invention what is claimed is:

1. A removable holder to be mounted on a surface for supporting a pair of eyeglasses, said eyeglasses having a pair of rims for containing the lenses and connected together by a nose piece and a bow extending from each of said rims, said holder comprising:
   a. base means comprising an extended plate;
   b. a suction cup means for supporting said suction cup on one side of said plate directed toward one end of and at an angle to said plate, wherein said means for supporting said suction cup comprises a triangular shaped member having one surface thereof on one side of said base, a second surface having means attached to said suction cup, and one corner of said triangular shaped member adjacent said base attached to said support means thereby providing a rigid structure;
   c. support means for said pair of eyeglasses pivotally attached to the end of said plate opposite to said suction cup; and
   d. said support means comprising a pair of spaced, parallel rectangular elements joined by a curved center element means having a sine wave shape with the top of said wave directed to the same side of said plate as said suction cup, said suction cup being mounted on a surface having a vertical component, said one end of said plate making contact with said surface below said suction cup to bolster said holder and prevent rattling of said eyeglasses.

2. The holder of claim 1 wherein said support means includes means to adjust and lock axially the orientation of the top of said sine-wave shape to permit said holder to be mounted on a surface which may extend at any angle to the horizontal while maintaining said eyeglasses in an upright position.

3. The holder of claim 2 wherein said adjust means comprises a first cylinder attached to said extended plate and a second cylinder aligned with said first cylinder attached to one of said rectangular elements, shaft means extending through both of said cylinders, each cylinder having teeth facing each other for engagement, and spring means mounted on one end of said shaft means for biasing said cylinders against each other with said teeth being engaged for locking their relative position, said spring means permitting said second cylinder to be rotated into any selected position.

* * * * *